Figure 3:
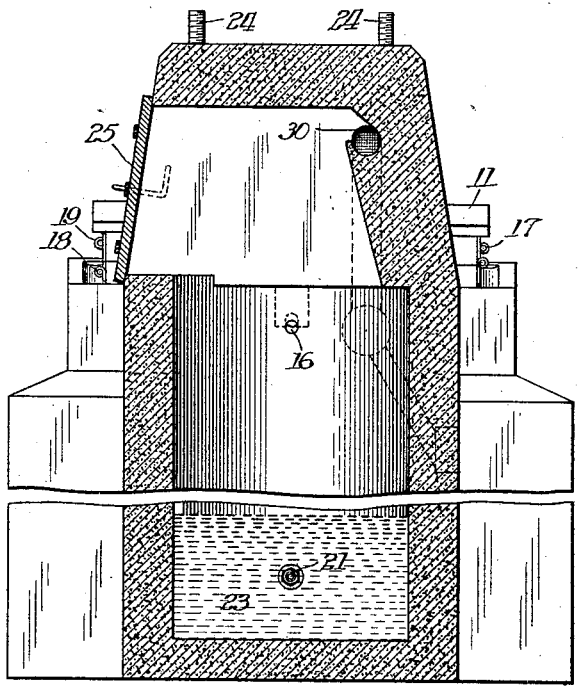

J. A. JOHNSON.
COMBINATION BATTERY VAULT, CISTERN, AND SEMAPHORE FOUNDATION.
APPLICATION FILED MAY 20, 1912.
1,057,843.
Patented Apr. 1, 1913.
2 SHEETS—SHEET 1.
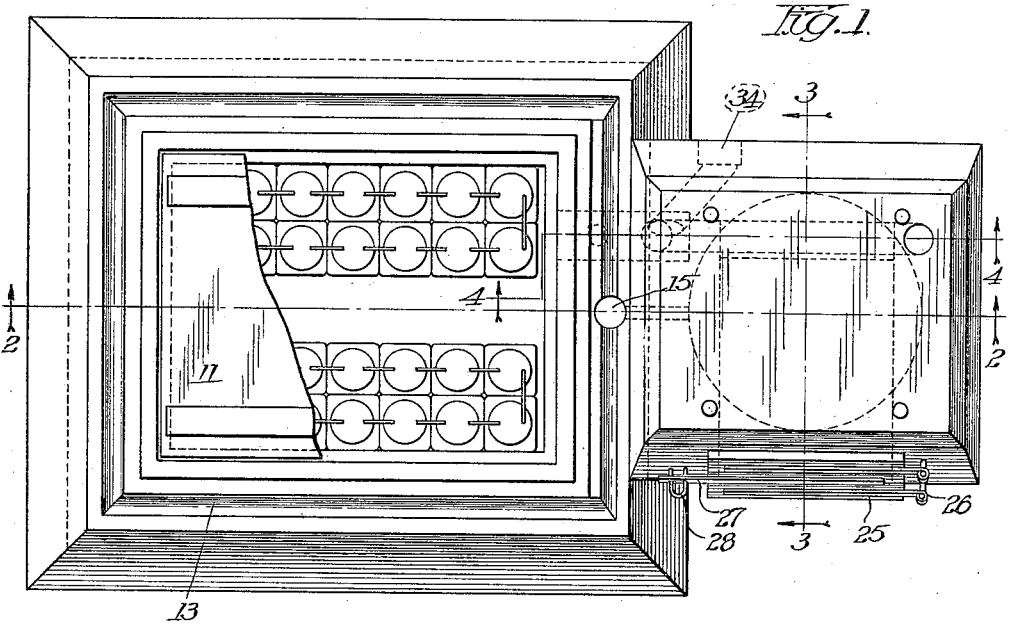
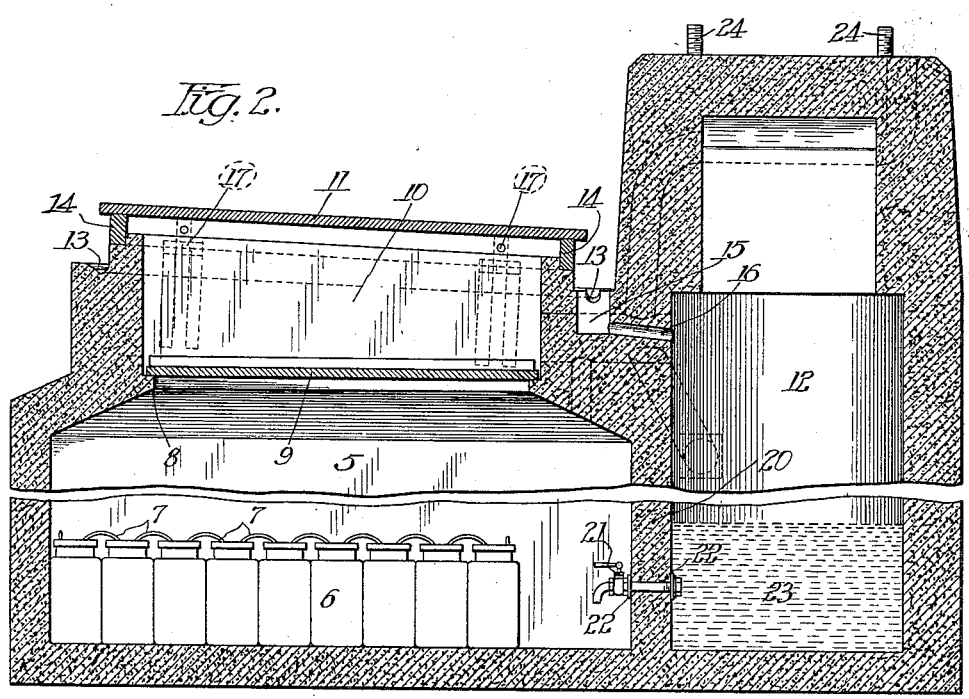

J. A. JOHNSON.
COMBINATION BATTERY VAULT, CISTERN, AND SEMAPHORE FOUNDATION.
APPLICATION FILED MAY 20, 1912.

1,057,843.

Patented Apr. 1, 1913.
2 SHEETS—SHEET 2.

UNITED STATES PATENT OFFICE.

JOHN A. JOHNSON, OF DENISON, TEXAS.

COMBINATION BATTERY-VAULT, CISTERN, AND SEMAPHORE FOUNDATION.

1,057,843.  Specification of Letters Patent.  Patented Apr. 1, 1913.

Application filed May 20, 1912. Serial No. 698,378.

*To all whom it may concern:*

Be it known that I, JOHN A. JOHNSON, a citizen of the United States, residing at Denison, in the county of Grayson and State of Texas, have invented certain new and useful Improvements in Combination Battery-Vaults, Cisterns, and Semaphore Foundations, of which the following is a specification.

My invention relates to improvements in a combination battery vault, cistern and semaphore foundation.

In connection with the usual railway signal systems it is customary to use battery cells, cisterns to supply the same with water, and foundation supports for semaphore signal devices. My invention contemplates the combining of these three structures into a single integral structure, each of the three structures which enter into the single structure being, in accordance with my invention, formed in a manner to enhance the individual utility of the others in maximum degree or to have its own utility so enhanced by the mutual arrangement and collocation of the various parts of the article of manufacture herein described and claimed.

More specifically, the salient object of my invention is to construct and arrange a semaphore-foundation, a battery vault, and a cistern in a single integral structure so that the cistern may be better protected and made more firm by the intimate association therewith of the foundation structure, so that the opening to the cistern may pass through the thick solid wall of the foundation structure for greater strength in coaction with the closure for said opening; so that the conduit leading from the battery vault to the upper exposed surface of said foundation may be accessible through said same opening; so that the foundation structure may have the additional solidity, when placed in the ground, afforded by the battery vault of suitable structure; so that the battery vault may have its door arranged for suitable drainage of rain therefrom through a conduit into the cistern; so that said three duit structures may have a solid integral wall portion in common, of considerable thickness and suitably located with respect to said three structures so as to be most advantageously provided with bores leading from a gutter around the cover of the battery vault to the cistern, and leading from an air space under said cover respectively to the battery vault, to the exposed upper surface of the foundation structure, above the cistern, and to the exterior, all of said conduits arranged for easiest accessibility and each of said three structures being, without interference with the above and other features of mutual interdependence, most able to perform its respective functions.

Other and further objects of my invention will become readily apparent to persons skilled in the art from a consideration of the following description when taken in conjunction with the drawings, wherein—

Figure 4:
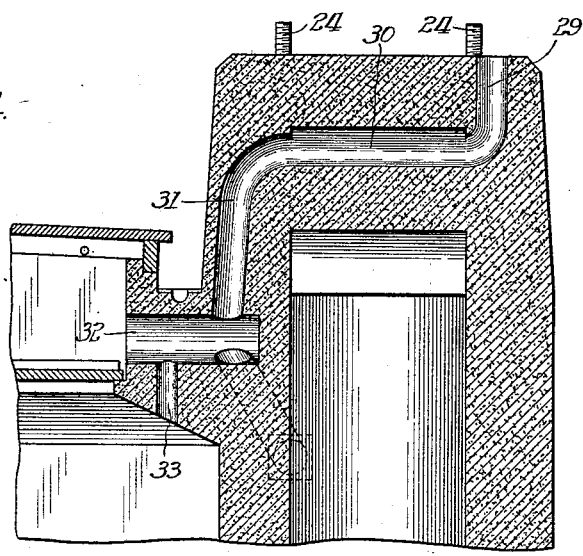

Figure 1. is a plan view, with a part of the vault cover removed. Fig. 2. is a longitudinal central section, on line 2—2 of Fig. 1. Fig. 3. is a transverse section, taken on line 3—3, through the cistern and foundation, of Fig. 1. Fig. 4. is a section taken on line 4—4 of Fig. 1.

In all of the views the same reference characters are used to indicate similar parts.

Where block signals are used along the line of a railway track, a battery of electric cells is necessary, at regular intervals along the road or track, to energize the signal circuits. It has been found convenient to locate such batteries in vaults placed below the surface of the earth. Adjacent such battery containers or vaults, a semaphore signal target is usually erected, and to maintain such device in a vertical position a good substantial frost resisting foundation is required. These structures have heretofore been made separate and are usually constructed upon the ground where they are to be used. To supply the deficiency of water, due to evaporation and decomposition in the battery cells, a pure soft quality of water is required, such as rain water. Many roads run through sections of the country, wherein the natural supply of water is brackish, or alkaline which is entirely unfit for this purpose. I, therefore, provide a water containing cistern, preferably beneath the semaphore support, or foundation, and I also provide a drain from the top cover of the battery vault whereby all of the rain water that falls upon said cover will be entrained directly into the cistern, and for purposes of convenience I provide a controllable means for conducting the water from said cistern for use within the battery vault, without the necessity of leaving the vault to secure the water needed when the battery cells are being filled.

My invention consists in a combined integral structure containing the above features and, preferably, such a self contained structure that may be made complete at the factory and shipped in finished condition to points where it is to be used ready for "planting." To this end the walls of the structure are made of cement, sand and gravel grouting, poured into proper forms and permitted to set and to dry before the forms are removed. I prefer to make this grouting, with such materials that are well known in the art for making it substantially waterproof, or to so proportion the cement to the other parts of the mixture as to render it inherently waterproof without the addition of other materials, for this purpose. The method of waterproofing the conglomerate forms no part of my invention and any other methods, than those referred to, may be employed for this purpose. The desideratum being to make the walls waterproof so as to hold the water contained within the cistern, and to prevent the entrance of water through the walls into the battery vault or into the cistern.

In the manufacture of my structure, it is manifest that reinforcing metallic mesh fabric or rods may be employed for strengthening the mass as is usual in such work. These features I have not shown, as they form no part of the invention, but may be used for giving strength and holding the various parts of the structure together.

In Fig. 2, it will be observed that the upper and lower parts of the structure are separated. This is done to indicate that the depth of the cistern, and of the battery vault, may be made in accordance with the requirements, due to the locality in which the device is to be placed. In cold climate where the frost penetrates to a great depth below the surface of the earth, it is essential that the device should be made so that it may be buried deeper into the ground, that the bottom portion thereof, may be below the frost line, while in milder climates the structure need not be placed so deep, as the frost does not penetrate to so great a distance, and therefore, it is only necessary to place the device below the maximum depth of penetration of the frost.

5 is the battery vault, showing a series of cells 6, placed on the floor thereof, connected together, as at 7. The battery is to be connected to the circuit wires leading through a conduit made into the cement wall, which conduit will be hereafter referred to. The battery vault is contracted near the top, in the exemplification illustrated, and a ledge, 8 is provided for the purpose of supporting a sub-cover 9 to provide an air space, 10 between the said cover and the super-imposed cover, 11. These covers are preferably made of wood and the upper cover is preferably over-laid with tin, or such substance, to render it water tight, and to preserve the wood. It will be observed that the upper cover 11, slants somewhat toward the right hand side, the left side being somewhat higher than the right side. The object of this is to drain the water toward the cistern 12. The top 11, overhangs its support 14, and immediately below the overhanging portion of the top is a gutter 13 which surrounds the top and has a slight pitch toward the cistern to conduct the water to a draining receptacle 15, and a conduit 16 into the cistern both of which passageways are made in the concrete body. The top is provided with hinges 17, and on the other side with a hasp and staple 18 and 19 respectively for the purpose of locking the top in place and preventing its removal. A separating wall 20, is provided between the battery vault 5, and the cistern 12, and a faucet 21, having suitable packing washers 22, projects through the wall and is the controlling means for conducting the water 23, from the cistern into the battery vault. The cistern walls are extended above the surface line, or at the point where the cistern is contracted, to provide a foundation for a semaphore base. The anchor bolts 24, are embedded in the concrete and may extend, if necessary, to the bottom of the cistern.

In Fig. 3, it will be observed, that one of the side walls, surrounding the cistern has been cut away, above the point where the cistern is contracted, to permit entrance into the cistern, this opening is closed by a door 25 hinged as at 26, and provided with a hasp 27 that engages the staple 28. This may also be locked to prevent displacement, and the opening covered by the door, may be used as a means for introducing a supply of water into the cistern from the locomotive, when the rain fall in the neighborhood in which the device is located is not sufficient to maintain the proper supply of water.

Electric conducting wires must pass from the battery vault into the hollow vertical support that maintains the semaphore target in position and, therefore, I provide a conduit in the concrete body, consisting of a vertical portion 29, the interior, and preferably the open portion 30 and the down turned vertical portion 31, which communicates with the horizontal portion 32, that may open into the space 10, between the two doors of the battery vault, and it also communicates with the conduit 33, for entrance directly into the battery vault 5. In block signal systems, there are other wires that are located parallel with the track, and are placed underground that must communicate with the batteries within the vault and also with the particular target mechanism. I therefore, provide another conduit 34, which is shown in dotted lines on all the figures, which also communicates with the horizontal portion 32, from which latter portion wires may be led into the battery vault or into the support for the semaphoric signal device.

While I have herein shown and described only a single specific representation of my invention for the purpose of complete disclosure, it is manifest that changes may be made in the structure, within the scope of the claims without departing from the spirit thereof.

What I claim and desire to secure by Letters Patent is;

1. A structure of the character described shaped to provide a cistern having a circular interior, the upper portion of said cistern being shaped to provide a foundation supporting base, said structure being interiorly formed to provide a rectangular space above and communicating with said circular space, said foundation structure having an opening in one side communicating with said rectangular space and communicating therethrough with said circular space, the walls of the structure having therein a conduit leading from the upper surface thereof parallel to and in communication with said rectangular space and extending thence through the wall of said structure, and a battery vault integral with said cistern structure, the common wall between said cistern and battery vault extending up to said foundation structure, whereby the latter is a continuation of said wall, said conduit in the foundation structure extending through the upper portion of said wall into communication with the battery vault.

2. A structure of the character described, shaped to provide a battery-holding space narrowed at its top, the wall of said battery vault being thickened above said narrowed portion and providing at its top a cover-receiving portion and a gutter surrounding said cover receiving portion, a cistern having a wall in common with said battery vault and extending above said narrowed portion of the battery vault, the portion of said structure between the upwardly extending cistern and that portion of the battery vault which extends above its narrowed portion being integrally connected into a solid wall portion, said solid wall portion having perforations (15 and 16) leading from said gutter to said cistern.

3. A structure of the character described shaped to provide a cistern, the upper portion of the cistern being shaped to provide a foundation supporting base, the cistern having a water-receiving space in a lower zone and a narrowed space in a zone above said water-receiving space, said narrowed space having a straight side wall, the foundation structure having an opening in one side in said zone of the narrowed space and communicating therethrough with the water-receiving space therebelow, the walls of the structure having therein a conduit leading from the upper surface thereof having a portion parallel to said straight wall of the narrowed space of said cistern and in communication with said space along said parallel portion of the conduit, said conduit extending from the parallel portion through the wall of said structure, and a battery vault integral with said cistern structure, the common wall between the cistern and battery vault extending up to the foundation structure, whereby the latter is a continuation of said wall, said conduit extending through the upper portion of said wall into communication with the battery vault.

In testimony whereof I hereunto set my hand in the presence of two witnesses.

JOHN A. JOHNSON.

In the presence of—
E. H. WINFREY,
R. M. FINLEY.

---

Copies of this patent may be obtained for five cents each, by addressing the "Commissioner of Patents, Washington, D. C."